United States Patent
Kurumisawa et al.

(10) Patent No.: US 10,392,015 B2
(45) Date of Patent: Aug. 27, 2019

(54) VEHICLE CONTROL DEVICE AND VEHICLE CONTROL METHOD

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Jin Kurumisawa, Kariya (JP); Mitsuhiro Tokimasa, Kariya (JP); Toyoharu Katsukura, Kariya (JP); Yoshihisa Ogata, Kariya (JP); Takeshi Nanami, Toyota (JP); Takashi Nishida, Toyota (JP)

(73) Assignees: DENSO CORPORATION, Kariya, Aichi-pref. (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 65 days.

(21) Appl. No.: 15/545,268

(22) PCT Filed: Jan. 20, 2016

(86) PCT No.: PCT/JP2016/051572
§ 371 (c)(1),
(2) Date: Jul. 20, 2017

(87) PCT Pub. No.: WO2016/117602
PCT Pub. Date: Jul. 28, 2016

(65) Prior Publication Data
US 2018/0015923 A1 Jan. 18, 2018

(30) Foreign Application Priority Data
Jan. 21, 2015 (JP) .................... 2015-009776

(51) Int. Cl.
*B60W 50/00* (2006.01)
*B60W 30/165* (2012.01)
(Continued)

(52) U.S. Cl.
CPC ........ *B60W 30/165* (2013.01); *B60W 30/095* (2013.01); *B60W 30/16* (2013.01);
(Continued)

(58) Field of Classification Search
CPC .. B60W 30/165; B60W 30/095; B60W 30/16; B60W 50/0097; B60W 2540/18;
(Continued)

(56) References Cited

U.S. PATENT DOCUMENTS 6,292,752 B1 * 9/2001 Franke .................. G01S 13/931
340/435
2013/0304322 A1 * 11/2013 Isaji ..................... B62D 15/025
701/41

FOREIGN PATENT DOCUMENTS

JP 2004-220341 A 8/2004
JP 4407315 B 11/2009

* cited by examiner

*Primary Examiner* — Gertrude Arthur Jeanglaude
(74) *Attorney, Agent, or Firm* — Knobbe, Martens, Olson & Bear, LLP (57) ABSTRACT

A vehicle control device mounted on the own vehicle and configured to control the own vehicle according to the position of another vehicle ahead of the own vehicle. The vehicle control device comprises an estimated course calculation means calculating an estimated course of the own vehicle; a setting means setting a parameter indicating whether the other vehicle is in the path of the own vehicle based on the relative position of the other vehicle with respect to the own vehicle in a lateral direction orthogonal to the estimated course of the own vehicle; a determination means determining whether the other vehicle is a leading (Continued)

vehicle in the path of the own vehicle based on the parameter; and a changing means changing the likelihood of being determined as the leading vehicle when the estimated course is a curve, based on the estimated course and the position of the other vehicle.

16 Claims, 6 Drawing Sheets

(51) Int. Cl.
*B60W 30/16* (2012.01)
*G08G 1/04* (2006.01)
*G08G 1/056* (2006.01)
*G08G 1/16* (2006.01)
*B60W 30/095* (2012.01)
*B60K 31/00* (2006.01)

(52) U.S. Cl.
CPC .......... *B60W 50/0097* (2013.01); *G08G 1/04* (2013.01); *G08G 1/056* (2013.01); *G08G 1/163* (2013.01); *G08G 1/166* (2013.01); *B60K 2031/0016* (2013.01); *B60K 2031/0025* (2013.01); *B60W 2540/18* (2013.01); *B60W 2550/146* (2013.01)

(58) Field of Classification Search
CPC ... B60W 2550/146; G08G 1/04; G08G 1/056; G08G 1/163; G08G 1/166; B60K 2031/0016; B60K 2031/0025
USPC ........................................................ 701/117
See application file for complete search history.

VEHICLE CONTROL DEVICE AND VEHICLE CONTROL METHOD

CROSS-REFERENCE TO RELATED APPLICATION

This application is based on and claims the benefit of priority from earlier Japanese Patent Application No. 2015-009776 filed on Jan. 21, 2015 the descriptions of which is incorporated herein by reference.

TECHNICAL FIELD

The present disclosure relates to vehicle control technologies, implemented on a vehicle or the like, for detecting another vehicle ahead of the vehicle.

BACKGROUND ART

PTL 1 discloses a vehicle control device that detects the position of another vehicle ahead of the own vehicle and uses the relative position of the other vehicle with respect to the own vehicle to determine whether the other vehicle is a leading vehicle that should be the target of the following control.

In PTL 1, an own lane probability, which is a parameter for determining whether the other vehicle is the target leading vehicle of the following control, is associated with the other vehicle. Specifically, as a field for determining whether another vehicle is present in the path of the own vehicle, a probability map is set within a certain area on an imaginary plane (imaginary coordinate space) ahead of the own vehicle. In PTL 1, whether the other vehicle should be selected as the target leading vehicle of the following control is determined using the relative lateral position of the other vehicle with respect to the own vehicle on the set probability map. The relative lateral position of the other vehicle with respect to the own vehicle on the probability map is corrected based on the curvature of the path of the own vehicle.

CITATION LIST

Patent Literature

[PTL 1] JP 4407315 B

SUMMARY OF THE INVENTION

Technical Problem

In cases where the curvature of the path of the own vehicle is estimated from the yaw rate and speed of the vehicle, there may be a difference between the curvature of the actual road and the estimated curvature when the own vehicle is traveling through a curved part of the road. Thus, if the probability map is set based on the estimated curvature and the own lane probability is obtained according to the set probability map, the obtained own lane probability may take a value that is different from the actual presence probability. If whether the other vehicle should be selected as the target leading vehicle of the following control is determined using the own lane probability thus obtained, another vehicle traveling on a lane adjacent to the own lane may be erroneously selected as the leading vehicle. In addition, another vehicle traveling on the own lane may not be selected as the leading vehicle.

An object of the present disclosure is to provide vehicle control technologies that can improve the accuracy of leading vehicle selection.

Solution to Problem

A vehicle control device according to the present disclosure is mounted on the own vehicle, and configured to control the own vehicle according to the position of another vehicle ahead of the own vehicle. The device includes an estimated course calculation means, setting means, determination means, and changing means. The estimated course calculation means calculates an estimated course of the own vehicle. The setting means sets a parameter indicating whether the other vehicle is in the path of the own vehicle based on the relative position of the other vehicle with respect to the own vehicle in a lateral direction orthogonal to the estimated course of the own vehicle. The determination means determines whether the other vehicle is a leading vehicle in the path of the own vehicle based on the parameter. The changing means changes the likelihood of the other vehicle being determined as the leading vehicle by the determination means when the estimated course calculated by the estimated course calculation means is a curve, based on the estimated course and the position of the other vehicle.

For example, when the curvature of the estimated course of the own vehicle is smaller than the curvature of the actual road, a problem as follows may occur. When another vehicle is offset to the inside direction relative to the curve described by the estimated course of the own vehicle, the parameter may take a value indicating that the other vehicle is not on the own lane on which the own vehicle is traveling when the other vehicle is on the own lane. On the other hand, when another vehicle is offset to the outside direction relative to the curve described by the estimated course of the own vehicle, the parameter may take a value indicating that the other vehicle is on the own lane on which the own vehicle is traveling when the other vehicle is not on the own lane.

In view of the above, the vehicle control device according to the present disclosure comprises a changing means changing the likelihood of the other vehicle being selected as the target leading vehicle of the following control based on the estimated course of the own vehicle and the relative position of the other vehicle with respect to the own vehicle. Thus, when the estimated course of the own vehicle and the relative position of the other vehicle with respect to the own vehicle have a relationship such that the other vehicle is incorrectly less likely to be selected as the leading vehicle, the changing means can make the other vehicle more likely to be determined as the leading vehicle. On the other hand, when the estimated course of the own vehicle and the relative position of the other vehicle with respect to the own vehicle have a relationship such that the other vehicle is incorrectly more likely to be selected as the leading vehicle, the changing means can make the other vehicle less likely to be determined as the leading vehicle. Consequently, the vehicle control device according to the present disclosure achieves improved accuracy in selecting another vehicle as the target leading vehicle of the following control.

DESCRIPTION OF THE EMBODIMENTS

Embodiments will be described below with reference to the drawings. In the drawings, the same or equivalent parts in the embodiments described below are assigned with the same reference numbers, and earlier description should be referred to regarding those parts having the same reference number as another.

First Embodiment

A first embodiment of the present disclosure will be described with reference to drawings. A vehicle control device according to this embodiment is mounted on a vehicle and has an ACC (Adaptive Cruise Control) function. The vehicle control device uses the ACC function to make the own vehicle follow another vehicle in such a manner that the distance between the own vehicle and the other vehicle detected by the object detection means is at the target value of the following distance corresponding to the vehicle speed (driving speed). In addition, when another vehicle is not detected, the vehicle control device controls the vehicle speed to a speed set as the target value.

Figure 1:
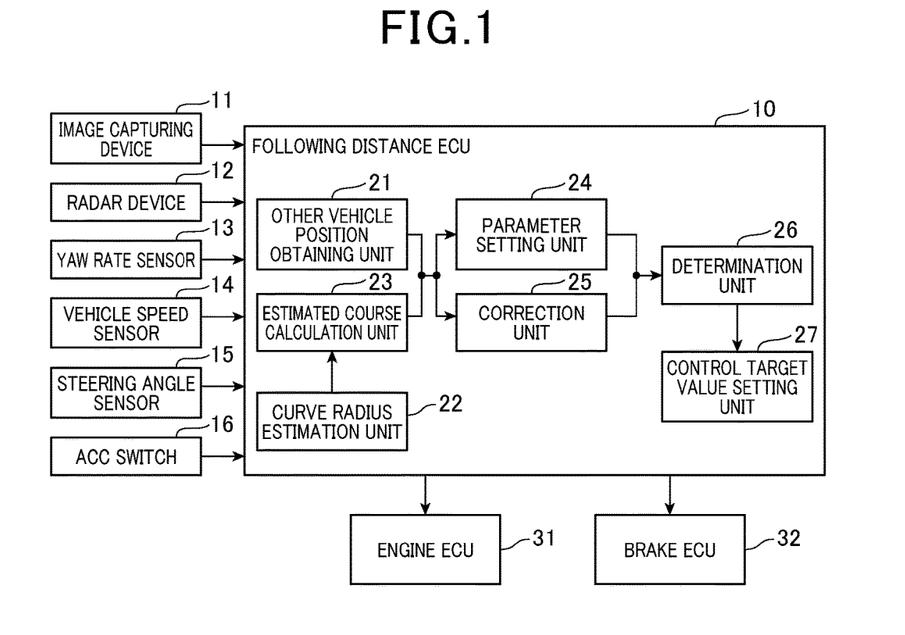
FIG. 1 is a diagram showing an overall configuration of a vehicle control device.

Referring to FIG. 1, a following distance control ECU 10 corresponding to the vehicle control device according to this embodiment is a computer comprising a CPU, ROM, RAM, I/O, etc. The following distance control ECU 10 comprises functional units such as an other vehicle position obtaining unit 21, a curve radius estimation unit 22, an estimated course calculation unit 23, a parameter setting unit 24, a correction unit 25, a determination unit 26, and a control target value setting unit 27. With the CPU executing programs installed in the ROM, the following distance control ECU 10 realizes these functions.

The vehicle is equipped with an image capturing device 11 and a radar device 12 as the object detection means. The image capturing device 11 is a vehicle mounted camera. For example, the image capturing device 11 comprises a CCD camera, a CMOS image sensor, a near-infrared camera, or the like. The image capturing device 11 captures an image of the surrounding environment of the own vehicle (surrounding of the vehicle) including the road on which it is traveling, and generates image data of the captured image. The image capturing device 11 successively outputs generated image data to the following distance control ECU 10. For example, the image capturing device 11 is attached near the upper edge of the windshield. The image capturing device 11 captures an image of an area ahead of the vehicle having a certain angular width θ1 with the imaging axis passing through its center (the detection area of the image capturing device 11). The image capturing device 11 may be a single lens camera or a stereo camera.

The radar device 12 is a searching device that transmits a transmission signal such as an electromagnetic wave and receives the reflected wave to detect an object. For example, the radar device 12 may comprise a millimeter wave radar. The radar device 12 is attached to the front of the own vehicle. The radar device 12 uses a radar signal to scan an area ahead of the vehicle having a certain angular width θ2 (θ2<θ1) with the optical axis passing through its center (the detection area of the radar device 12). The radar device 12 generates distance measurement data of the detected object based on the time from transmission of an electromagnetic wave towards the space ahead of the vehicle to reception of the reflected wave. The radar device 12 successively outputs generated distance measurement data to the following distance control ECU 10. The distance measurement data includes information on the direction of the object from the own vehicle, the distance from the own vehicle to the object, and the relative velocity of the object with respect to the own vehicle.

The image capturing device 11 and the radar device 12 are attached such that the imaging axis which is the reference axis of the image capturing device 11 and the optical axis which is the reference axis of the radar device 12 are in the same direction as a direction parallel to the surface of the road on which the own vehicle is traveling. The detection area of the image capturing device 11 and the detection area of the radar device 12 at least partially overlap with each other.

The following distance control ECU 10 obtains image data from the image capturing device 11 and distance measurement data from the radar device 12. In addition, the following distance control ECU 10 obtains detection signals from other various sensors mounted on the vehicle. Examples of the other various sensors may include a yaw rate sensor 13, a vehicle speed sensor 14, a steering angle sensor 15, and an ACC switch 16. The yaw rate sensor 13 detects the angular velocity of the vehicle in its turning direction (yaw rate). The vehicle speed sensor 14 detects the speed of the vehicle. The steering angle sensor 15 detects the steering angle of the vehicle. The ACC switch 16 is a switch manipulated by the driver to select the following control mode of the own vehicle.

The other vehicle position obtaining unit 21 in the following distance control ECU 10 obtains the relative position (two dimensional space coordinates) of the other vehicle with respect to the own vehicle based on the distance measurement data obtained from the radar device 12. The distance measurement data may include information such as information on the distance between the own vehicle and the other vehicle and information on the relative lateral position of the other vehicle with respect to the own vehicle (lateral position information).

The curve radius estimation unit 22 in the following distance control ECU 10 calculates an estimation R which is the curvature of the curved road (curved course) based on the yaw rate detected by the yaw rate sensor 13 and the vehicle speed detected by the vehicle speed sensor 14. The estimation R calculated by the curve radius estimation unit 22 is inputted into the estimated course calculation unit 23. The calculation method of the estimation R is not limited to this. As an example of other calculation methods of the estimation R, it may be calculated using image data. It may also be calculated based on the steering angle detected by the steering angle sensor 15 and the vehicle speed detected by the vehicle speed sensor 14.

The estimated course calculation unit 23 in the following distance control ECU 10 serves as an estimated course calculation means calculating the estimated course of the own vehicle based on the calculated estimation R (serves as a means for estimating the course of the own vehicle). The estimated course calculation unit 23 may store a plurality of values of the estimation R per unit time calculated over a certain period of time in a certain storage area (for example, memory), and use the current value and past values of the estimation R to calculate the estimated course of the own vehicle.

The relative position of the other vehicle with respect to the own vehicle obtained by the other vehicle position obtaining unit 21, the estimation R calculated by the curve radius estimation unit 22, and the estimated course calculated by the estimated course calculation unit 23 are inputted into the parameter setting unit 24 and the correction unit 25 in the following distance control ECU 10. The determination unit 26 in the following distance control ECU 10 determines whether the other vehicle is a leading vehicle in the path of the own vehicle based on the processing results from the parameter setting unit 24 and the correction unit 25. If the other vehicle is determined as a leading vehicle in the path of the own vehicle, the following distance control ECU 10 selects the determined other vehicle as the target leading vehicle of the following control. The specific processes in the functional units, the parameter setting unit 24, the correction unit 25, and the determination unit 26, will be described later.

The following distance control ECU 10 maintains the following distance between the selected leading vehicle and the own vehicle at a preset target distance by controlling the speed of the own vehicle. To this end, the control target value setting unit 27 in the following distance control ECU 10 calculates a control target value to which the speed of the own vehicle is controlled in order to maintain the target distance, and sets the calculated control target value. Specifically, the control target value setting unit 27 calculates control values such as the target engine output and the required braking force, and outputs the calculated control values as control signals to an engine ECU 31 (engine electronic control unit) and a brake ECU 32 (brake electronic control unit). It is to be noted that although the following distance control ECU 10 outputs control signals to the engine ECU 31 and the brake ECU 32 in this embodiment, this is not limiting. For example, the configuration of control signal outputting may be such that the following distance control ECU 10 outputs a control signal to only one ECU (electronic control unit) of the engine ECU 31 and the brake ECU 32. In this case, the engine ECU 31 or the brake ECU 32 into which the control signal has been inputted from the following distance control ECU 10 outputs the control signal to the other ECU.

Next, the processes carried out by the parameter setting unit 24 and the determination unit 26 will be described in detail. The parameter setting unit 24 sets an own lane probability S as a parameter for determining whether the other vehicle ahead of the own vehicle is on the lane on which the own vehicle is traveling (a parameter indicating whether the other vehicle is in the path of the own vehicle). The parameter setting unit 24 serves as a setting means setting a parameter indicating whether the other vehicle is in the path of the own vehicle based on the relative position of the other vehicle with respect to the own vehicle in a lateral direction orthogonal to the estimated course of the own vehicle. The determination unit 26 serves as a determination means determining whether the other vehicle is a leading vehicle in the path of the own vehicle based on the set parameter. The own lane probability S will be described using FIG. 2.

Figure 2:
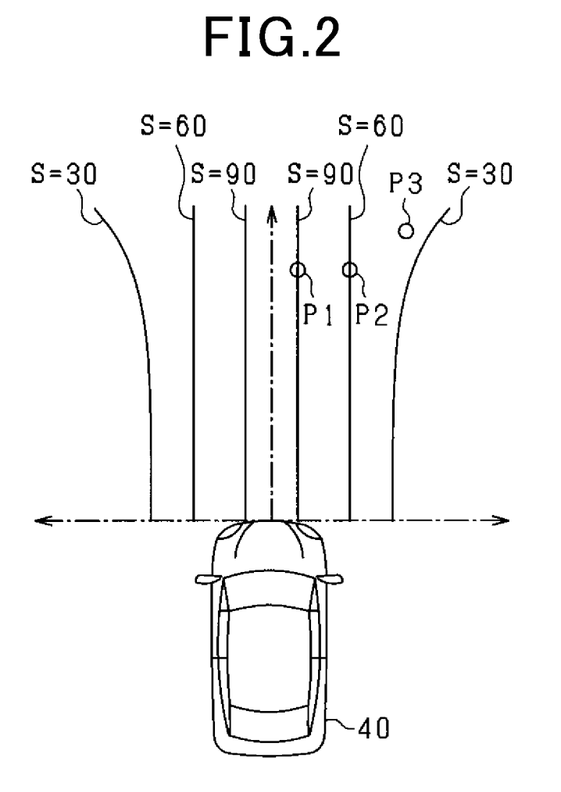
FIG. 2 is a diagram showing a probability map.

In order to associate another vehicle with the own lane probability S, the parameter setting unit 24 sets a probability map which is a field for determining whether another vehicle is present in the path of the own vehicle 40 within a certain area on an imaginary plane (imaginary coordinate space) ahead of the own vehicle 40. The parameter setting unit 24 thus associates the own lane probability S, which is a parameter for determining whether the other vehicle is a target leading vehicle of the following control, with the other vehicle ahead of the own vehicle 40. This probability map is set within a range searchable by the radar device 12 (within the detection area). Positions (coordinates) on the probability map are associated with own lane probabilities S. Thus, the following distance control ECU 10 can calculate (obtain) the own lane probability S of another vehicle with respect to the own vehicle 40 by mapping the relative position of the other vehicle with respect to the own vehicle 40 to a position on the coordinate space of the probability map. FIG. 2 shows an example of the probability map in which own lane probabilities S ranging between 30 and 90 are associated with the imaginary coordinate space that shows the relative positions of other vehicles ahead of the own vehicle 40. As shown in FIG. 2, the own lane probabilities S on the probability map are set such that the closer to the path of the own vehicle 40 (closer to the centerline of the own lane), the higher the value (S=90). Further, the value of the own lane probability S gradually decreases (decreases stepwise) as it moves away from the path of the own vehicle 40 in a lateral direction orthogonal to the path of the own vehicle 40. In addition, the own lane probabilities S are set such that the associated ranges of positions become partially larger as it gets further from the own vehicle 40. The reason for this setting is that the further it gets from the own vehicle 40, the larger the error in the position of the object detected by the radar device 12. Although FIG. 2 shows positions calculated (obtained) in cases where the own lane probabilities S are 90, 60, and 30, the own lane probability S is set at a plurality of levels which, for example, change by 1. Each of the levels has a certain lateral width (hereinafter referred to as "zone width"). That is, the own lane probability S changes gradually in association with certain lateral zone widths on an imaginary coordinate space that shows the relative positions of other vehicles ahead of the own vehicle 40. If the relative position of another vehicle is inside the area of a certain zone width, the relative position of that other vehicle is associated with the own lane probability S of that zone width. It is to be noted that the reference values of the zone widths (reference widths) are predetermined based on the typical lane widths of roads where the leading vehicle following control is expected to be carried out, for example, highways.

Even when the path of the own vehicle 40 is a curve, the probability map will be corrected on the assumption that the path is straight. This correction of the probability map is carried out based on the estimated course of the own vehicle 40. That is, the relative lateral position of the other vehicle with respect to the own vehicle 40 indicates the amount of positional difference in a direction orthogonal to the estimated course of the own vehicle 40.

The determination unit 26 calculates the own lane probability S of the other vehicle based on the relative position of the other vehicle with respect to the own vehicle 40 and the set probability map, and compares the calculated own lane probability S with a certain threshold. If the value of the own lane probability S is equal to or greater than the threshold, the determination unit 26 determines that the other vehicle whose own lane probability S has been calculated is a leading vehicle in the path of the own vehicle 40.

The following distance control ECU 10 thereby selects the other vehicle as the target leading vehicle of the following control. On the other hand, if the value of the own lane probability S is smaller than the threshold, the determination unit 26 determines that the other vehicle whose own lane probability S has been calculated is not a leading vehicle in the path of the own vehicle 40. If the other vehicle is a vehicle that is already selected as the leading vehicle, the following distance control ECU 10 cancels its selection as the leading vehicle. Thus, the threshold with which the own lane probability S is compared corresponds to a certain criterion value for determining whether the other vehicle is a leading vehicle in the path of the own vehicle 40.

For example, on the probability map shown in FIG. 2, when the relative position of another vehicle is detected at a position P1 near the path of the own vehicle 40 (near the centerline of the own lane), the calculated own lane probability S of the other vehicle will be 90. When the relative position of another vehicle is detected at a position P2 shifted in a lateral direction from the vicinity of the path of the own vehicle 40, the calculated own lane probability S of the other vehicle will be 60. When the relative position of another vehicle is detected at a position P3 shifted further in a lateral direction from the vicinity of the path of the own vehicle 40, the calculated own lane probability S of the other vehicle will be about 40. Here, for example, if the threshold (criterion value) is set at 50, it will be determined that the other vehicle at the position P1 or P2 is a leading vehicle in the path of the own vehicle 40 since the own lane probability S is equal to or greater than the threshold. As a result, the other vehicle at the position P1 or P2 will be selected as the target leading vehicle of the following control. On the other hand, it will be determined that the other vehicle at the position P3 is not a leading vehicle in the path of the own vehicle 40 since the own lane probability S is smaller than the threshold. As a result, the other vehicle at the position P3 will not be selected as the target leading vehicle of the following control. That is, if the other vehicle is a vehicle that is already selected as the leading vehicle, its selection as the leading vehicle will be canceled. The threshold (criterion value) is set such that the area in which the own lane probability S becomes equal to or greater than the threshold is inside the lane width, and the area in which the own lane probability S is smaller than the threshold is outside the lane width.

Although specific probabilities (values) of the own lane probability S are shown on the probability map in FIG. 2, they are merely examples. That is, any probability map is possible as long as the own lane probability S is set such that the closer the relative lateral position of another vehicle with respect to the own vehicle 40 is to the path of the own vehicle 40 (the centerline of the own lane), the more likely the other vehicle is selected as the leading vehicle.

Meanwhile, the curvature of the actual road may differ from the curvature of the estimated course estimated when the own vehicle 40 has entered a curved section (curved road) from a straight section (straight road) of the road on which it is traveling. As described above, the following distance control ECU 10 calculates the estimated course of the own vehicle 40 using the estimation R, and calculates the own lane probability S of the other vehicle using the amount of difference in a direction orthogonal to the calculated estimated course. Thus, if the curvatures of the estimated course and the actual road differ, the calculated own lane probability S will have a value that is different from the actual presence probability. As a result, if whether the other vehicle should be selected as the target leading vehicle of the following control is determined using such own lane probability S, the selection of the other vehicle as the leading vehicle may become erroneous.

Figure 3:
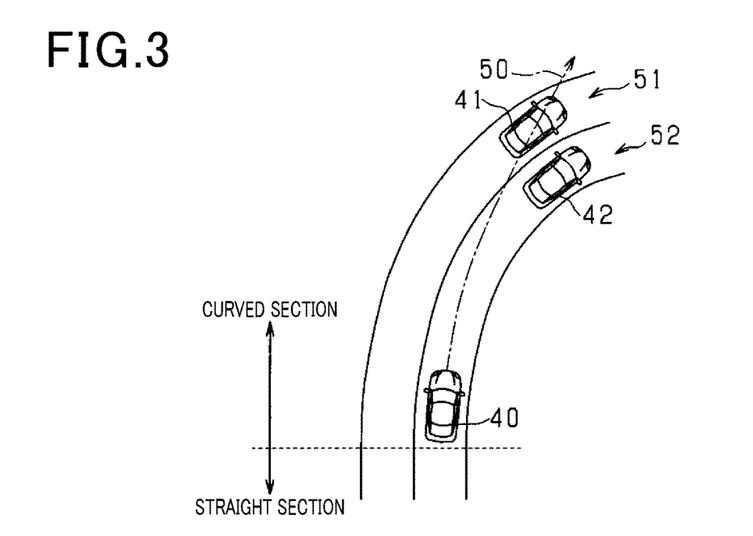
FIG. 3 is a diagram showing an exemplary case where the curvature of the estimated course is smaller than the curvature of the actual road.

FIG. 3 shows a case where the own vehicle 40 has entered a curved section from a straight section of the road on which it is traveling (when the own vehicle 40 is traveling near the entrance of a curved road), and the curvature of the estimated course 50 differs from the curvature of the actual road. In particular, FIG. 3 shows a case where the curvature of the estimated course 50 is smaller than the curvature of the actual road. First, the own vehicle 40 shown in FIG. 3 is traveling on a right lane 52 (own lane) which is the lane of a four-lane road on the right side with respect to the traveling direction. A second other vehicle 42 is traveling on the same right lane 52 ahead of the own vehicle 40. In addition, a first other vehicle 41 is traveling on a left lane 51 which is the lane of the four-lane road on the left side with respect to the traveling direction (the lane adjacent to the own R of the road on which the own vehicle 40 is traveling is calculated based on the yaw rate of the own vehicle 40 at a point near which the curved section starts. Thus, as shown by the dot-and-dash line, the estimated course 50 of the own vehicle 40 calculated based on this estimation R has a curvature smaller than the curvature of the actual road. If the own lane probability S of the other vehicle is calculated using such estimated course 50, the first other vehicle 41 traveling on the left lane 51 that is not the own lane will be selected as the leading vehicle. As a result, the own vehicle 40 may be controlled to follow the selected first other vehicle 41.

In view of the above, the correction unit 25 makes the first other vehicle 41 located outside the estimated course 50 of the own vehicle 40 less likely to be selected as the leading vehicle. Further, the correction unit 25 makes the second other vehicle 42 located inside the estimated course 50 of the own vehicle 40 more likely to be selected as the leading vehicle. That is, the correction unit 25 performs a criterion correction process to change the likelihood of another vehicle being determined (selected) as the leading vehicle. In particular, if the estimated course 50 of the own vehicle 40 is a curve indicating a curved section as shown in FIG. 3, the correction unit 25 carries out a correction process as follows. As for the first other vehicle 41 located outside the estimated course 50 of the own vehicle 40 (outside the curve), the threshold (criterion value) with which the own lane probability S is compared is increased from a certain value (the threshold is increased). Thus, the correction unit 25 makes the first other vehicle 41 traveling on the left lane 51 that is not the own lane less likely to be selected as the leading vehicle. On the other hand, regarding the second other vehicle 42 located inside the estimated course 50 of the own vehicle 40 (inside the curve), the threshold with which the own lane probability S is compared is reduced from a certain value (the threshold is decreased). Thus, the correction unit 25 makes the second other vehicle 42 traveling ahead of the own vehicle 40 on the right lane 52 on which the own vehicle 40 is traveling more likely to be selected as the leading vehicle. Thus, the correction unit 25 serves as a changing means that, when the estimated course 50 of the own vehicle 40 is a curve, changes the likelihood of the other vehicle being selected as the leading vehicle based on this estimated course 50 and the relative position of the other vehicle with respect to the own vehicle 40.

Figure 4:
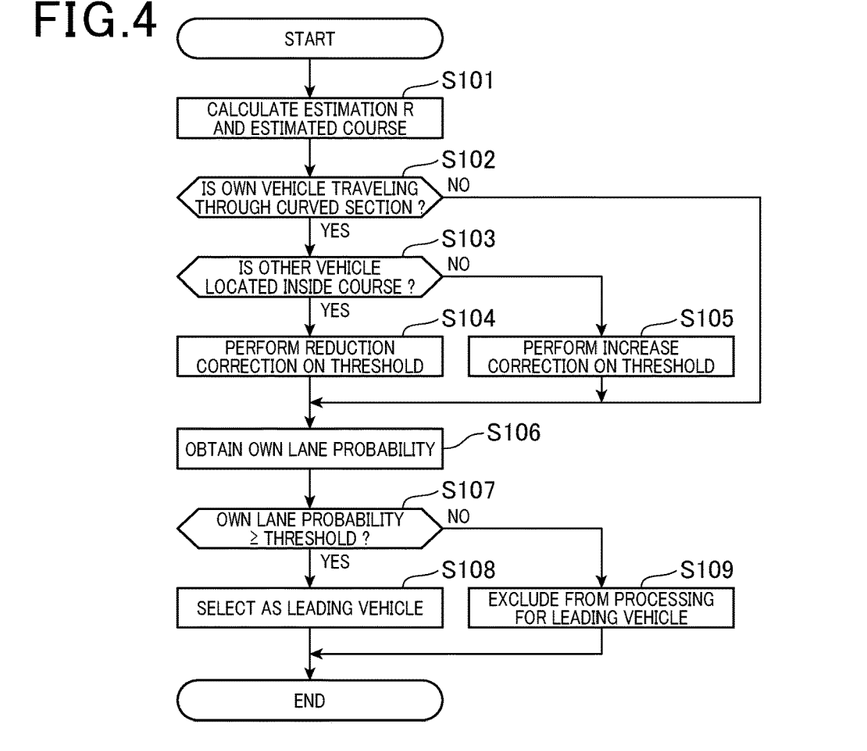
FIG. 4 is a flowchart showing processes according to the first embodiment.

FIG. 4 is a flowchart showing the series of processing steps performed by the following distance control ECU 10 according to this embodiment. The processes in the flowchart shown in FIG. 4 are repeated at a certain control cycle for each of the other vehicles traveling ahead of the own vehicle 40.

First, the following distance control ECU 10 calculates the estimation R, and calculates the estimated course 50 based on the calculated estimation R (S101). The process at S101 is a process carried out by the curve radius estimation unit 22 and the estimated course calculation unit 23. To be more specific, the curve radius estimation unit 22 calculates the estimation R of the road on which the own vehicle 40 is traveling, and the estimated course calculation unit 23 calculates the estimated course 50 of the own vehicle 40 based on the estimation R. Next, the following distance control ECU 10 determines whether the own vehicle 40 is traveling through a curved section (S102). The following distance control ECU 10 determines whether the own vehicle 40 is traveling through a curved section based on the result of the determination of whether the calculated estimated course 50 is a curve indicating a curved section. If it is determined that the own vehicle 40 is traveling through a curved section (S102: YES), the following distance control ECU 10 determines whether the relative position of the other vehicle with respect to the own vehicle 40 is inside the estimated course 50 (inside the curve) (S103). The following distance control ECU 10 determines whether the relative position of the other vehicle with respect to the own vehicle 40 is inside the estimated course 50 based on the positional information on the other vehicle obtained by the other vehicle position obtaining unit 21. Next, if it is determined that the relative position of the other vehicle is inside the estimated course 50 (S103: YES), the following distance control ECU 10 carries out a correction process of reducing from a certain value the threshold (criterion value) with which the own lane probability S is compared to determine whether the other vehicle should be selected as the leading vehicle (S104). That is, if the own vehicle 40 is traveling through a curved section (the estimated course 50 is a curve) and the other vehicle is located inside the estimated course 50, the following distance control ECU 10 reduces the threshold, i.e., the criterion used in the leading vehicle selection. The following distance control ECU 10 thereby makes the other vehicle being subjected to the determination more likely to be selected as the leading vehicle. On the other hand, if it is determined that the relative position of the other vehicle is outside the estimated course 50 (S103: NO), the following distance control ECU 10 carries out a correction process of increasing from a certain value the threshold with which the own lane probability S is compared to determine whether the other vehicle should be selected as the leading vehicle (S105). That is, if the own vehicle 40 is traveling through a curved section and the other vehicle is located outside the estimated course 50, the following distance control ECU 10 increases the threshold, i.e., the criterion used in the leading vehicle selection. The following distance control ECU 10 thereby makes the other vehicle being subjected to the determination less likely to be selected as the leading vehicle. If it is determined that the own vehicle 40 is not traveling through a curved section (S102: NO), the following distance control ECU 10 does not correct the threshold with which the own lane probability S is compared to determine whether the other vehicle should be selected as the leading vehicle. The processes at S102-S105 are carried out by the correction unit 25.

Next, the following distance control ECU 10 obtains the own lane probability S of the other vehicle based on the relative lateral position of the other vehicle with respect to the own vehicle 40 and the probability map (S106). The following distance control ECU 10 refers to the data of the probability map set by the parameter setting unit 24 to find the relative position of the other vehicle on the coordinate space of the probability map. Then, the following distance control ECU 10 obtains the probability value set in association with the found position as the own lane probability S of the other vehicle. Next, the following distance control ECU 10 compares the obtained own lane probability S with the threshold (criterion value), and determines whether the value of the own lane probability S is equal to or greater than the threshold based on the result of the comparison (S107). In the process at S107, if the own vehicle 40 is traveling through a curved section (the estimated course 50 is a curve) and the other vehicle is located inside the estimated course 50, a threshold after reduction correction (criterion value after reduction correction) is used as the threshold with which the own lane probability S of the other vehicle is compared. On the other hand, in the process at S107, if the own vehicle 40 is traveling through a curved section and the other vehicle is located outside the estimated course 50, a threshold after increase correction (criterion value after increase correction) is used as the threshold with which the own lane probability S of the other vehicle is compared. Further, in the process at S107, if the own vehicle 40 is not traveling through a curved section (the estimated course 50 is not a curve), a certain threshold (certain criterion value) that has not been corrected is used as the threshold with which the own lane probability S of the other vehicle is compared. If the own lane probability S of the other vehicle is determined to be equal to or greater than the threshold (S107: YES), the following distance control ECU 10 determines that the other vehicle being subjected to the determination is a leading vehicle in the path of the own vehicle 40, and selects the other vehicle as the target leading vehicle of the following control based on the result of the determination (S108). Then, the following distance control ECU 10 terminates the process. On the other hand, if the own lane probability S of the other vehicle is determined to be smaller than the threshold (S107: NO), the following distance control ECU 10 determines that the other vehicle being subjected to the determination is not a leading vehicle in the path of the own vehicle 40, and excludes the other vehicle from processing for the target leading vehicle of the following control based on the result of the determination (S109). That is, in the process at S109, if the other vehicle being subjected to the determination is not already selected as the target leading vehicle of the following control, it will not be selected as the leading vehicle. If the other vehicle being subjected to the determination is already selected as the target leading vehicle of the following control, its selection as the leading vehicle will be canceled. Then, the following distance control ECU 10 terminates the process. The processes at S106-S109 are carried out by the determination unit 26.

It is to be noted that if the other vehicle continues to be determined as the leading vehicle in the path of the own vehicle 40 for a certain period of time in a state where the threshold is increased (after increase correction of the criterion value), it is likely that the result of the determination stays the same even if the threshold after increase correction is reset to its default value. In addition, in a state where the threshold is increased, another vehicle traveling on the same lane as the own vehicle 40 (the own lane) is less likely to be selected as the leading vehicle. Thus, if the other vehicle continues to be determined as the leading vehicle in the path of the own vehicle 40 for a certain period of time in a state where the threshold is increased, the following distance control ECU 10 may reset the threshold after increase correction to its default value. Similarly, if the other vehicle continues to be determined not to be the leading vehicle in the path of the own vehicle 40 for a certain period of time in a state where the threshold is reduced (after reduction correction of the criterion value), the following distance control ECU 10 may also reset the threshold after reduction correction to its default value.

With the above configuration, the vehicle control device according to this embodiment provides the following effects.

The vehicle control device according to this embodiment determines whether there is another vehicle located inside the estimated course 50 of the own vehicle 40 (inside the curve) calculated based on the estimation R of the road (curved road) on which it is traveling. If it is determined that there is another vehicle located inside the estimated course 50, the vehicle control device reduces (decreases) the threshold (criterion value) with which the own lane probability S is compared to determine whether the other vehicle should be selected as the leading vehicle. The vehicle control device thereby makes the other vehicle located inside the estimated course 50 of the own vehicle 40 more likely to be selected as the target leading vehicle of the following control. Thus, for example, when the own vehicle 40 is entering a curved section from a straight section of the road on which it is traveling, and the curvature of the estimated course 50 of the own vehicle 40 is smaller than the curvature of the actual road, the vehicle control device can prevent another vehicle ahead of the own vehicle 40 on the lane on which the own vehicle 40 is traveling (the own lane) from not being selected as the leading vehicle.

If there is another vehicle located outside the estimated course 50 of the own vehicle 40 (outside the curve), the vehicle control device according to this embodiment increases (raises) the threshold (criterion value) with which the own lane probability S is compared to determine whether the other vehicle should be selected as the leading vehicle. The vehicle control device thereby makes the other vehicle located outside the estimated course 50 of the own vehicle 40 less likely to be selected as the target leading vehicle of the following control. Thus, for example, when the own vehicle 40 is entering a curved section from a straight section of the road on which it is traveling, and the curvature of the estimated course 50 of the own vehicle 40 is smaller than the curvature of the actual road, the vehicle control device can prevent another vehicle ahead of the own vehicle 40 on a lane that is different from the lane on which the own vehicle 40 is traveling (the own lane) from being selected as the leading vehicle.

If another vehicle continues to be determined as the leading vehicle in the path of the own vehicle 40 for a certain period of time in a state where the threshold is increased (after increase correction of the criterion value), the vehicle control device according to this embodiment resets the threshold after increase correction to its default value. Thus, the vehicle control device can facilitate the state in which the other vehicle is determined as the leading vehicle to continue for the other vehicle determined as the leading vehicle. That is, for example, the vehicle control device can facilitate the state in which the other vehicle traveling on the same lane as the own vehicle 40 (the own lane) is selected as the target leading vehicle of the following control to continue.

If another vehicle continues to be determined not to be the leading vehicle in the path of the own vehicle 40 for a certain period of time in a state where the threshold is reduced (after reduction correction of the criterion value), the vehicle control device according to this embodiment resets the threshold after reduction correction to its default value. Thus, the vehicle control device can facilitate the state in which the other vehicle is not determined as the leading vehicle to continue for the other vehicle determined not to be the leading vehicle. That is, for example, the vehicle control device can facilitate the state in which the other vehicle traveling on a lane (an adjacent lane) different from the lane on which own vehicle 40 is traveling (the own lane) is not selected as the target leading vehicle of the following control to continue.

Second Embodiment

The vehicle control device according to this embodiment has the same general configuration as the vehicle control device according to the first embodiment, but differs in a part of the processes performed by the following distance control ECU 10 corresponding to the vehicle control device.

The first embodiment expects that when the own vehicle 40 is entering a curved section from a straight section of the road on which it is traveling, the curvature of the estimated course 50 of the own vehicle 40 becomes smaller than the curvature of the actual road, and changes the likelihood of the other vehicle being determined (selected) as the leading vehicle. On the other hand, when the own vehicle 40 is entering a straight section from a curved section, such as when the own vehicle 40 is traveling through the latter part of a curved section, the curvature of the estimated course 50 of the own vehicle 40 may become larger than the curvature of the actual road.

Figure 5:
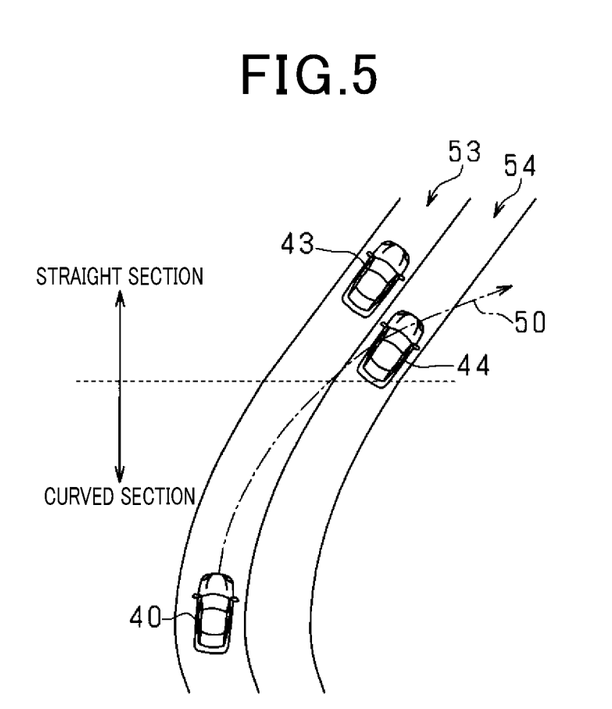
FIG. 5 is a diagram showing an exemplary case where the curvature of the estimated course is larger than the curvature of the actual road.

FIG. 5 shows a case where the own vehicle 40 is entering a straight section from a curved section of the road on which it is traveling (when the own vehicle 40 is traveling near the exit of a curved road), and the curvature of the estimated course 50 differs from the curvature of the actual road. Specifically, FIG. 5 shows a case where the curvature of the estimated course 50 is larger than the curvature of the actual road. First, the own vehicle 40 shown in FIG. 5 is traveling on a left lane 53 (own lane) which is the lane of a four-lane road on the left side with respect to the traveling direction. A third other vehicle 43 is traveling on the same left lane 53 ahead of the own vehicle 40. In addition, a fourth other vehicle 44 is traveling on a right lane 54 which is the lane of the four-lane road on the right side with respect to the traveling direction (the lane adjacent to the own lane), and the fourth other vehicle 44 is ahead of the own vehicle 40. The estimation R of the road on which the own vehicle 40 is traveling is calculated based on the yaw rate of the own vehicle 40 at a point near which the curved section ends. Thus, as shown by the dot-and-dash line, the estimated course 50 of the own vehicle 40 calculated based on this estimation R has a curvature that is larger than the curvature of the actual road. If the own lane probability S of the other vehicle is calculated using such estimated course 50, the position of the third other vehicle 43 traveling on the left lane 53 that is the own lane will deviate from the estimated course 50, and it will not be selected as the leading vehicle. Further, in such case, the fourth other vehicle 44 traveling on the right lane 54 that is not the own lane will be selected as the leading vehicle. As a result, the own vehicle 40 may be controlled to follow the selected fourth other vehicle 44.

In view of the above, the correction unit 25 in the following distance control ECU 10 according to this embodiment makes the third other vehicle 43 located outside the estimated course 50 of the own vehicle 40 more likely to be selected as the leading vehicle. Further, the correction unit 25 makes the fourth other vehicle 44 located inside the estimated course 50 of the own vehicle 40 less likely to be selected as the leading vehicle. That is, the correction unit 25 according to this embodiment performs a process that is opposite to the criterion correction process (the process of changing the likelihood of another vehicle being determined as the leading vehicle) described in connection with the first embodiment. In particular, as shown in FIG. 5, if the estimation R of the road on which the own vehicle 40 is traveling (the curvature of the estimated course 50) gradually decreases, the correction unit 25 according to this embodiment carries out a correction process as follows. As for the third other vehicle 43 located outside the estimated course 50 of the own vehicle 40 (outside the curve), the threshold (criterion value) with which the own lane probability S is compared is reduced from a certain value (the threshold is reduced). Thus, the correction unit 25 according to this embodiment makes the third other vehicle 43 traveling ahead of the own vehicle 40 on the left lane 53 on which the own vehicle 40 is traveling more likely to be selected as the leading vehicle. On the other hand, regarding the fourth other vehicle 44 located inside the estimated course 50 of the own vehicle 40 (inside the curve), the threshold with which the own lane probability S is compared is increased from a certain value (the threshold is increased). Thus, the correction unit 25 according to this embodiment makes the fourth other vehicle 44 traveling on the right lane 54 that is not the own lane less likely to be selected as the leading vehicle. Thus, the correction unit 25 according to this embodiment serves as a changing means that, when the estimation R of the road on which the own vehicle 40 is traveling (the curvature of the estimated course 50) gradually decreases, changes the likelihood of the other vehicle being selected as the leading vehicle based on the estimated course 50 of the own vehicle 40 and the relative position of the other vehicle with respect to the own vehicle 40.

It is to be noted that when the own vehicle 40 is traveling through a section where the estimation R of the road on which the own vehicle 40 is traveling (the curvature of the estimated course 50) gradually increases, such as near the entrance to a curved road, the correction unit 25 according to this embodiment carries out a process similar to the criterion correction process described in connection with the first embodiment. Which of the criterion correction processes described in connection with the first embodiment and this embodiment should be carried out is determined as follows. In this embodiment, whether the estimation R of the road on which the own vehicle 40 is traveling (the curvature of the estimated course 50) is gradually increasing, or whether it is gradually decreasing is determined, and the correction process is determined based on the result of this determination.

Figure 6:
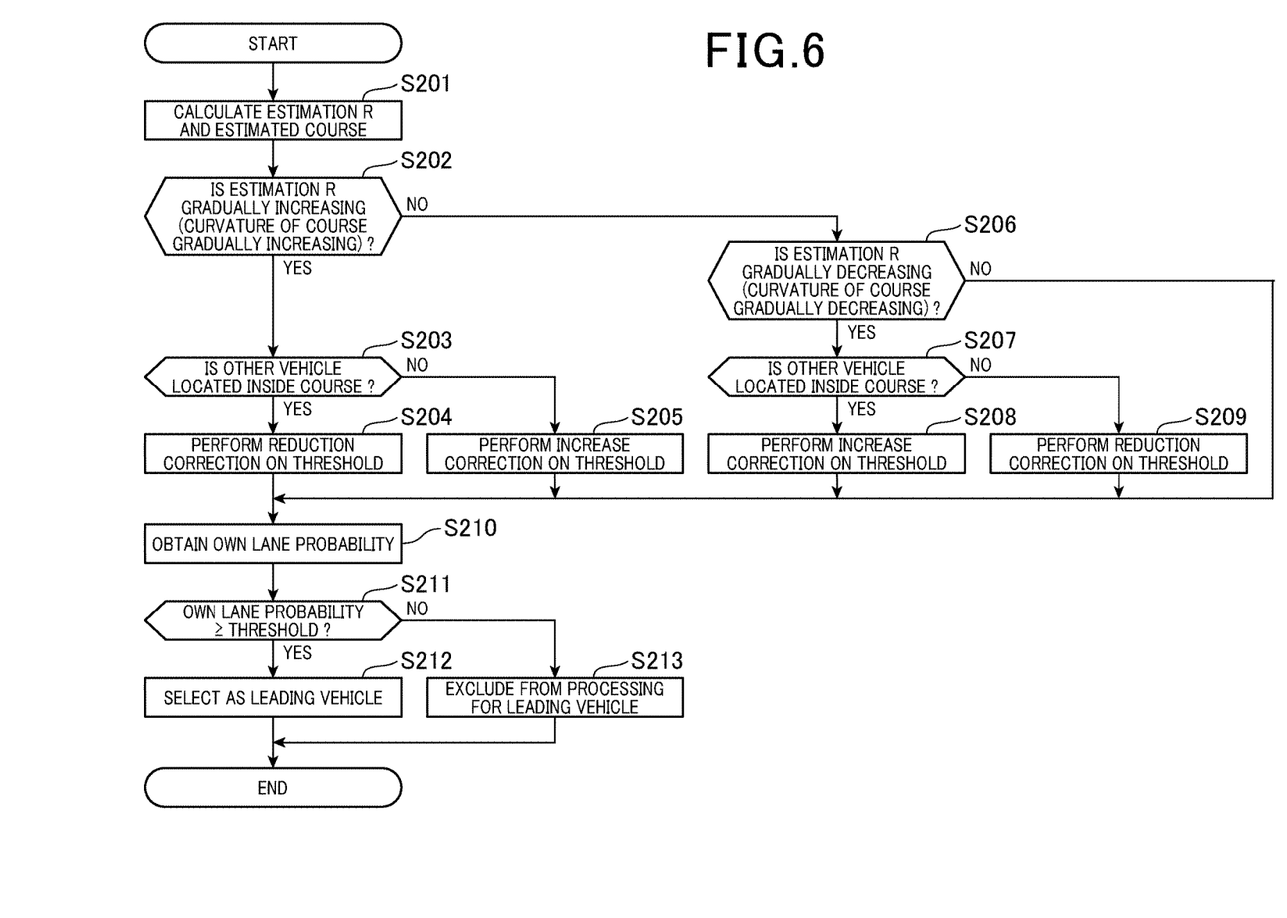
FIG. 6 is a flowchart showing processes according to the second embodiment.

FIG. 6 is a flowchart showing the series of processing steps performed by the following distance control ECU 10 according to this embodiment. The processes in the flowchart shown in FIG. 6 are repeated at a certain control cycle for each of the other vehicles traveling ahead of the own vehicle 40.

First, the following distance control ECU 10 calculates the estimation R of the road on which the own vehicle 40 is traveling, and calculates the estimated course 50 of the own vehicle 40 based on the calculated estimation R (S201). The process at S201 is a process carried out by the curve radius estimation unit 22 and the estimated course calculation unit 23 according to this embodiment, and is similar to the process at S101 according to the first embodiment. Next, the following distance control ECU 10 determines whether the estimation R of the road on which the own vehicle 40 is traveling (the curvature of the estimated course 50) is gradually increasing (S202). The following distance control ECU 10 compares the value of the estimation R calculated in the process of the current cycle (current value) with the value of the estimation R calculated in the process of the previous cycle (past value), and determines whether the estimation R is gradually increasing based on the result of this comparison. The following distance control ECU 10 stores a plurality of values of the estimation R per unit time calculated by the estimated course calculation unit 23 over a certain period of time in a certain storage area (for example, memory). If it is determined that the estimation R (the curvature of the estimated course 50) is gradually increasing (S202: YES), the following distance control ECU 10 determines that the own vehicle 40 is traveling through a part of a curved section where the curvature increases (for example, near the entrance of a curved road). The estimation R (the curvature of the estimated course 50) calculated in such case is likely to be smaller than the curvature of the actual road. Thus, if it is determined that the estimation R (the curvature of the estimated course 50) is gradually increasing, and the own vehicle 40 is traveling through a part of a curved section where the curvature increases (S202: YES), the following distance control ECU 10 carries out the criterion correction process described in connection with the first embodiment. That is, the following distance control ECU 10 determines whether the relative position of the other vehicle with respect to the own vehicle 40 is inside the estimated course 50 (inside the curve) (S203). If it is determined that the relative position of the other vehicle is inside the estimated course 50 (S203: YES), the following distance control ECU 10 carries out a correction process of reducing from a certain value the threshold (criterion value) with which the own lane probability S is compared to determine whether the other vehicle should be selected as the leading vehicle (S204). That is, if the own vehicle 40 is traveling through a part of a curved section where the curvature increases (near the entrance of a curved road), and the other vehicle is located inside the estimated course 50, the following distance control ECU 10 reduces the threshold, i.e., the criterion used in the leading vehicle selection. The following distance control ECU 10 thereby makes the other vehicle being subjected to the determination more likely to be selected as the leading vehicle. On the other hand, if it is determined that the relative position of the other vehicle is outside the estimated course 50 (S203: NO), the following distance control ECU 10 carries out a correction process of increasing from a certain value the threshold with which the own lane probability S is compared to determine whether the other vehicle should be selected as the leading vehicle (S205). That is, if the own vehicle 40 is traveling through a part of a curved section where the curvature increases, and the other vehicle is located outside the estimated course 50, the following distance control ECU 10 increases the threshold, i.e., the criterion used in the leading vehicle selection. The following distance control ECU 10 thereby makes the other vehicle being subjected to the determination less likely to be selected as the leading vehicle. The processes at S203-S205 are processes carried out by the correction unit 25 according to this embodiment, and are similar to the processes at S103-S105 according to the first embodiment.

Further, if it is determined that the estimation R (the curvature of the estimated course 50) is not gradually increasing (S202: NO), the following distance control ECU 10 determines whether the estimation R of the road on which the own vehicle 40 is traveling (the curvature of the estimated course 50) is gradually decreasing (S206). Similarly to the process at S202, the following distance control ECU 10 compares the value of the estimation R calculated in the process of the current cycle (current value) with the value of the estimation R calculated in the process of the previous cycle (past value), and determines whether the estimation R is gradually decreasing based on the result of this comparison. If it is determined that the estimation R (the curvature of the estimated course 50) is gradually decreasing (S206: YES), the following distance control ECU 10 determines that the own vehicle 40 is traveling through a part of a curved section where the curvature decreases (for example, near the exit of a curved road). The estimation R (the curvature of the estimated course 50) calculated in such case is likely to be larger than the curvature of the actual road. Thus, if it is determined that the estimation R (the curvature of the estimated course 50) is gradually decreasing, and the own vehicle 40 is traveling through a part of a curved section where the curvature decreases (S206: YES), the following distance control ECU 10 carries out the criterion correction process according to this embodiment. That is, the following distance control ECU 10 determines whether the relative position of the other vehicle with respect to the own vehicle 40 is inside the estimated course 50 (inside the curve) (S207). If it is determined that the relative position of the other vehicle is inside the estimated course 50 (S207: YES), the following distance control ECU 10 carries out a correction process of increasing from a certain value the threshold (criterion value) with which the own lane probability S is compared to determine whether the other vehicle should be selected as the leading vehicle (S208). That is, if the own vehicle 40 is traveling through a part of a curved section where the curvature decreases (near the exit of a curved road), and the other vehicle is located inside the estimated course 50, the following distance control ECU 10 increases the threshold, i.e., the criterion used in the leading vehicle selection. The following distance control ECU 10 thereby makes the other vehicle being subjected to the determination less likely to be selected as the leading vehicle. On the other hand, if it is determined that the relative position of the other vehicle is outside the estimated course 50 (S207: NO), the following distance control ECU 10 carries out a correction process of reducing from a certain value the threshold with which the own lane probability S is compared to determine whether the other vehicle should be selected as the leading vehicle (S209). That is, if the own vehicle 40 is traveling through a part of a curved section where the curvature decreases, and the other vehicle is located outside the estimated course 50, the following distance control ECU 10 reduces the threshold, i.e., the criterion used in the leading vehicle selection. The following distance control ECU 10 thereby makes the other vehicle being subjected to the determination more likely to be selected as the leading vehicle.

If it is determined that the estimation R of the road on which the own vehicle 40 is traveling (the curvature of the estimated course 50) is neither gradually increasing nor gradually decreasing (S206: NO), the following distance control ECU 10 does not correct the threshold (criterion value) with which the own lane probability S is compared to determine whether the other vehicle should be selected as the leading vehicle. This is because if the estimation R of the road on which the own vehicle 40 is traveling (the curvature of the estimated course 50) neither gradually increases nor gradually decreases, it is likely that the own vehicle 40 is traveling through a straight section (straight road), and there is no need to correct the threshold. It can also be considered that the curvature of the curved section through which the own vehicle 40 is traveling is constant and the calculated estimation R (the curvature of the estimated course 50) is generally equal to the curvature of the curved section, and thus correction of the threshold is not required. The processes at S202-S209 are carried out by the correction unit 25 according to this embodiment.

Next, the following distance control ECU 10 obtains the own lane probability S of the other vehicle based on the relative lateral position of the other vehicle with respect to the own vehicle 40 and the probability map (S210). Then, the following distance control ECU 10 compares the obtained own lane probability S with the threshold (criterion value), and determines whether the value of the own lane probability S is equal to or greater than the threshold (S211). In the process at S211, if the own vehicle 40 is traveling through a part of a curved section where the curvature increases (near the entrance of a curved road) and the other vehicle is located inside the estimated course 50, a threshold after reduction correction (criterion value after reduction correction) is used as the threshold with which the own lane probability S of the other vehicle is compared. On the other hand, in the process at S211, if the own vehicle 40 is traveling through a part of a curved section where the curvature increases and the other vehicle is located outside the estimated course 50, a threshold after increase correction (criterion value after increase correction) is used as the threshold with which the own lane probability S of the other vehicle is compared. In addition, in the process at S211, if the own vehicle 40 is traveling through a part of a curved section where the curvature decreases (near the exit of a curved road) and the other vehicle is located inside the estimated course 50, a threshold after increase correction is used as the threshold with which the own lane probability S of the other vehicle is compared. On the other hand, in the process at S211, if the own vehicle 40 is traveling through a part of a curved section where the curvature decreases and the other vehicle is located outside the estimated course 50, a threshold after reduction correction is used as the threshold with which the own lane probability S of the other vehicle is compared. Further, in the process at S211, if the estimation R of the road on which the own vehicle 40 is traveling (the curvature of the estimated course 50) neither gradually increases nor gradually decreases, a certain threshold (certain criterion value) that has not been corrected is used as the threshold with which the own lane probability S of the other vehicle is compared. If the own lane probability S of the other vehicle is determined to be equal to or greater than the threshold (S211: YES), the following distance control ECU 10 determines that the other vehicle being subjected to the determination is a leading vehicle in the path of the own vehicle 40, and selects the other vehicle as the target leading vehicle of the following control (S212). Then, the following distance control ECU 10 terminates the process. On the other hand, if the own lane probability S of the other vehicle is determined to be smaller than the threshold (S211: NO), the following distance control ECU 10 determines that the other vehicle being subjected to the determination is not a leading vehicle in the path of the own vehicle 40, and excludes the other vehicle from processing for the target leading vehicle of the following control based on the result of the determination (S213). That is, in the process at S213, if the other vehicle being subjected to the determination is not already selected as the target leading vehicle of the following control, it will not be selected as the leading vehicle. If the other vehicle being subjected to the determination is already selected as the target leading vehicle of the following control, its selection as the leading vehicle will be canceled. Then, the following distance control ECU 10 terminates the process. The processes at S210-S213 are processes carried out by the determination unit 26 according to this embodiment, and are similar to the processes at S106-S109 according to the first embodiment.

With the above configuration, the vehicle control device according to this embodiment provides the following effects, in addition to the effects provided by the vehicle control device according to the first embodiment.

In a section where the estimation R of the road on which the own vehicle 40 is traveling gradually increases, the curvature of the estimated course 50 tends to be smaller than the curvature of the actual road. In view of the above, in a section where the estimation R (the curvature of the estimated course 50) gradually increases, the vehicle control device according to this embodiment determines whether there is another vehicle located inside the estimated course 50 of the own vehicle 40 (inside the curve) calculated based on the estimation R. If it is determined that there is another vehicle located inside the estimated course 50, the vehicle control device reduces (decreases) the threshold (criterion value) with which the own lane probability S is compared to determine whether the other vehicle should be selected as the leading vehicle. The vehicle control device thereby makes the other vehicle located inside the estimated course 50 of the own vehicle 40 more likely to be selected as the target leading vehicle of the following control. Thus, the vehicle control device can prevent another vehicle ahead of the own vehicle 40 on the lane on which the own vehicle 40 is traveling (the own lane) from not being selected as the leading vehicle.

In a section where the estimation R (the curvature of the estimated course 50) gradually increases, if there is another vehicle located outside the estimated course 50 of the own vehicle 40 (outside the curve), the vehicle control device according to this embodiment increases (raises) the threshold (criterion value) with which the own lane probability S is compared to determine whether the other vehicle should be selected as the leading vehicle. Thus, the other vehicle located outside the estimated course 50 of the own vehicle 40 is less likely to be selected as the target leading vehicle of the following control. Accordingly, the vehicle control device can prevent another vehicle ahead of the own vehicle 40 on a lane that is different from the lane on which the own vehicle 40 is traveling (the own lane) from being selected as the leading vehicle.

In a section where the estimation R of the road on which the own vehicle 40 is traveling gradually decreases, the curvature of the estimated course 50 tends to be larger than the curvature of the actual road. In view of the above, in a section where the estimation R (the curvature of the estimated course 50) gradually decreases, if there is another vehicle located outside the estimated course 50 of the own vehicle 40 (outside the curve), the vehicle control device according to this embodiment reduces (decreases) the threshold (criterion value) with which the own lane probability S is compared to determine whether the other vehicle should be selected as the leading vehicle. The vehicle control device thereby makes the other vehicle located outside the estimated course 50 of the own vehicle 40 more likely to be selected as the target leading vehicle of the following control. Thus, the vehicle control device can prevent another vehicle ahead of the own vehicle 40 on the lane on which the own vehicle 40 is traveling (the own lane) from not being selected as the leading vehicle.

In a section where the estimation R (the curvature of the estimated course 50) gradually decreases, if there is another vehicle located inside the estimated course 50 of the own vehicle 40 (inside the curve), the vehicle control device according to this embodiment increases (raises) the threshold (criterion value) with which the own lane probability S is compared to determine whether the other vehicle should be selected as the leading vehicle. Thus, the other vehicle located inside the estimated course 50 of the own vehicle 40 is less likely to be selected as the target leading vehicle of the following control. Accordingly, the vehicle control device can prevent another vehicle ahead of the own vehicle 40 on a lane that is different from the lane on which the own vehicle 40 is traveling (the own lane) from being selected as the leading vehicle.

<Variations>

The above-described embodiments change the likelihood of another vehicle being selected as the leading vehicle by changing the threshold used to determine whether the other vehicle should be selected as the leading vehicle (correcting the criterion value used to select the leading vehicle). However, the way of changing the likelihood of another vehicle being determined (selected) as the leading vehicle is not limited to this. For example, another way to change the likelihood of the other vehicle being determined (selected) as the leading vehicle is to change the probability map instead of the threshold (criterion value).

Figure 7:
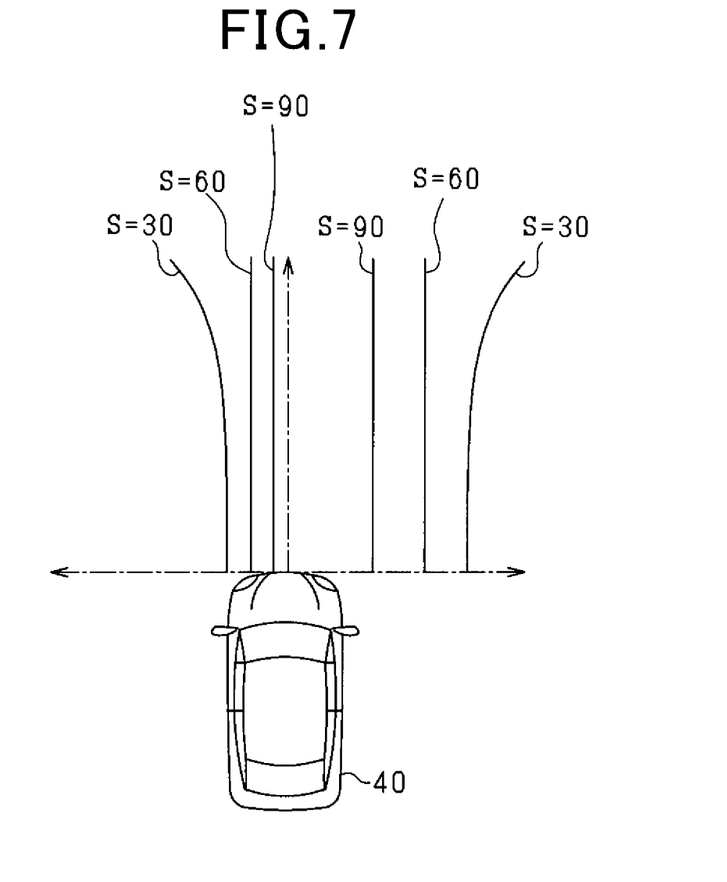
FIG. 7 is a diagram showing a variation of the probability map.

FIG. 7 shows an example of a probability map that has been changed. As with the driving situation shown in FIG. 3, FIG. 7 assumes a situation where the own vehicle 40 is entering a curved section from a straight section. Thus, FIG. 7 shows a probability map corresponding to a case where the calculated estimation R of the road on which the own vehicle 40 is traveling tends to be smaller than the curvature of the actual road. In order to make another vehicle located on the right side of the path of the own vehicle 40 (inside the estimated course 50) more likely to be selected as the leading vehicle, the relationship between the position coordinates on the imaginary plane in the path of the own vehicle 40 and the own lane probability S is changed in the probability map shown in FIG. 7. In particular, in this variation, in the area on the right side of the path of the own vehicle 40, the widths of the zones which associate position coordinates with own lane probabilities S are laterally increased. Thus, this variation can calculate (obtain) a high own lane probability S of the other vehicle being subjected to the determination even when the relative lateral position of the other vehicle with respect to the own vehicle 40 is the same. As a result, this variation can make the other vehicle being subjected to the determination more likely to be selected as the leading vehicle without changing the threshold which is the criterion used to select the leading vehicle.

On the other hand, in order to make another vehicle located on the left side of the path of the own vehicle 40 (outside the estimated course 50) less likely to be selected as the leading vehicle, the relationship between the position coordinates on the imaginary plane in the path of the own vehicle 40 and the own lane probability S is changed in the probability map shown in FIG. 7. In particular, in this variation, in the area on the left side of the path of the own vehicle 40, the widths of the zones which associate position coordinates with own lane probabilities S are laterally reduced. Thus, this variation can calculate (obtain) a low own lane probability S of the other vehicle being subjected to the determination even when the relative lateral position of the other vehicle with respect to the own vehicle 40 is the same. As a result, this variation can make the other vehicle being subjected to the determination less likely to be selected as the leading vehicle without changing the threshold which is the criterion used to select the leading vehicle.

The above-described first embodiment carries out a criterion correction process to make another vehicle located inside the estimated course 50 of the own vehicle 40 (inside the curve) more likely to be determined (selected) as the leading vehicle. In addition, the above-described first embodiment carries out a criterion correction process to make another vehicle located outside the estimated course 50 of the own vehicle 40 (outside the curve) less likely to be selected as the leading vehicle. Although the first embodiment carries out both of these two processes, this is not limiting. For example, the criterion may be corrected such that only one of the two processes are carried out. The same applies to the above-described second embodiment. For example, when the own vehicle 40 is entering a curved section from a straight section (when traveling near the entrance of a curved road), and when the own vehicle 40 is entering a straight section from a curved section (when traveling near the exit of a curved road), only the criterion correction process of making the other vehicle more likely to be determined (selected) as the leading vehicle may be carried out. In contrast, only the criterion correction process of making the other vehicle less likely to be determined (selected) as the leading vehicle may be carried out. As another example, when the own vehicle 40 is entering a curved section from a straight section, only the criterion correction process of making the other vehicle more likely to be determined (selected) as the leading vehicle is carried out. When the own vehicle 40 is entering a straight section from a curved section, the criterion correction process of making the other vehicle less likely to be determined (selected) as the leading vehicle may be carried out. In contrast, it is also possible that when the own vehicle 40 is entering a straight section from a curved section, only the criterion correction process of making the other vehicle more likely to be determined (selected) as the leading vehicle is carried out. When entering a curved section from a straight section, the criterion correction process of making the other vehicle less likely to be determined (selected) as the leading vehicle may be carried out.

In other variations of the above-described embodiments, whether the criterion correction process of changing the likelihood of another vehicle being determined (selected) as the leading vehicle should be carried out may be determined based on the relative velocity of the other vehicle with respect to the own vehicle 40. The relative velocity of the other vehicle with respect to the own vehicle 40 can be used to determine whether the own vehicle 40 and the other vehicle are getting close to each other (determining the approaching state of the vehicles). If the own vehicle 40 and the other vehicle are getting close to each other, the determination of whether the other vehicle should be selected as the leading vehicle needs to be carried out accurately in order to prevent the own vehicle 40 and the other vehicle getting too close. To this end, in the other variations, the processes according to the above-described embodiments are carried out only when the relative velocity of the other vehicle with respect to the own vehicle 40 indicates that the own vehicle 40 and the other vehicle are getting close to each other. Thus, these other variations can prevent erroneous determination of whether the other vehicle is the leading vehicle when the own vehicle 40 and the other vehicle are getting close to each other. In addition, the processing load of the control can be reduced.

In other variations of the above-described embodiments, whether the criterion correction process of changing the likelihood of another vehicle being determined (selected) as the leading vehicle should be carried out may be determined based on the relative distance of the other vehicle with respect to the own vehicle 40. When the relative distance of the other vehicle to the own vehicle 40 increases (the relative distance becomes further), the accuracy of the determination of whether the other vehicle should be the leading vehicle deteriorates. In addition, when the other vehicle is located near the own vehicle 40, it is likely that the other vehicle traveling on the lane on which the own vehicle 40 is traveling (own lane) is determined as the leading vehicle. On the other hand, it is unlikely that another vehicle traveling on a lane adjacent to the lane on which the own vehicle 40 is traveling is determined as the leading vehicle. Thus, in these other variations, the processes according to the above-described embodiments are carried out only when the relative distance of the own vehicle 40 and the other vehicle exceeds a certain value and a decrease in the determination accuracy is expected. Accordingly, these other variations can secure the determination accuracy when the relative distance of the own vehicle 40 and the other vehicle increases and the accuracy of the determination of whether the other vehicle should be selected as the leading vehicle is expected to decrease. In addition, the processing load of the control can be reduced.

The processes shown in the flowcharts referred to in connection with the above-described embodiments are merely examples of processes according to the above-described embodiments. The orders of the processes as well as a part of their contents may be changed.

Reference Signs List

10 . . . Vehicle control ECU; 23 . . . Estimated course calculation unit; 24 . . . Parameter setting unit; 25 . . . Correction unit; 26 . . . Determination unit.

The invention claimed is:

1. A vehicle control device mounted on an own vehicle and configured to control the own vehicle according to a position of another vehicle ahead of the own vehicle, comprising:
  at least one electronic control unit including a processor and memory storing instructions that when executed cause the electronic control unit to:
  calculate an estimated course of the own vehicle;
  set a parameter indicating whether the other vehicle is in the path of the own vehicle based on the position of the other vehicle with respect to the own vehicle in a lateral direction orthogonal to the calculated estimated course of the own vehicle;
  determine whether the other vehicle is a leading vehicle in the path of the own vehicle based at least in part on a comparison between the parameter and a threshold;
  determine whether the other vehicle is located radially inward relative to the calculated estimated course of the own vehicle, wherein the calculated estimated course comprises a curve;
  change the threshold and/or the parameter and change the likelihood of the other vehicle being determined as the leading vehicle in response to the calculated estimated course comprising a curve and in response to the other vehicle being located inside the calculated estimated course, based on the calculated estimated course and the position of the other vehicle; and output a control signal to control a vehicle speed to keep a distance between the own vehicle and the leading vehicle.

2. The vehicle control device according to claim 1, wherein in response to the calculated estimated course comprising a curve and the other vehicle is offset to the inside direction relative to the estimated course, the other vehicle is more likely to be determined as the leading vehicle.

3. The vehicle control device according to claim 1, wherein in response to the calculated estimated course comprising a curve and the other vehicle being offset to the outside direction relative to the estimated course, the other vehicle is less likely to be determined as the leading vehicle.

4. The vehicle control device according to claim 1, wherein in response to the curvature of the calculated estimated course gradually increasing and the other vehicle being located inside the estimated course, the other vehicle is more likely to be determined as the leading vehicle.

5. The vehicle control device according to claim 1, wherein in response to the curvature of the calculated estimated course gradually increasing and the other vehicle being located outside the estimated course, the other vehicle is less likely to be determined as the leading vehicle.

6. The vehicle control device according to claim 1, wherein in response to the curvature of the calculated estimated course gradually decreasing and the other vehicle being located inside the estimated course, the other vehicle is less likely to be determined as the leading vehicle.

7. The vehicle control device according to claim 1, wherein in response to the curvature of the calculated estimated course gradually decreasing and the other vehicle being located outside the estimated course, the other vehicle is more likely to be determined as the leading vehicle.

8. The vehicle control device according to claim 1, wherein the at least one electronic control unit is further configured to:
change the likelihood of the other vehicle being determined as the leading vehicle by changing the threshold.

9. The vehicle control device according to claim 1, wherein the at least one electronic control unit is further configured to:
change the likelihood of the other vehicle being determined as the leading vehicle by changing the parameter.

10. The vehicle control device according to claim 1, wherein in response to the other vehicle having been made more likely to be determined as the leading vehicle, and the other vehicle continuing to not be determined as the leading vehicle for a certain period of time, the electronic control unit is further configured to terminate the changing of making the other vehicle more likely to be determined as the leading vehicle.

11. The vehicle control device according to claim 1, wherein in response to the other vehicle having been made less likely to be determined as the leading vehicle, and the other vehicle continuing to be determined as the leading vehicle for a certain period of time, the electronic control unit is further configured to terminate the changing of making the other vehicle less likely to be determined as the leading vehicle.

12. The vehicle control device according to claim 1, wherein the electronic control unit is further configured to change the likelihood of the other vehicle being determined as the leading vehicle in response to the own vehicle and the other vehicle becoming close to each other.

13. The vehicle control device according to claim 1, wherein the electronic control unit is further configured to change the likelihood of the other vehicle being determined as the leading vehicle in response to the distance between the own vehicle and the other vehicle being greater than a certain value.

14. A vehicle control method for controlling an own vehicle according to a position of another vehicle ahead of the own vehicle and executable vehicle control device instructions, the method comprising:

calculating an estimated course of the own vehicle;

setting a parameter indicating whether the other vehicle is in the path of the own vehicle based on the position of the other vehicle with respect to the own vehicle in a lateral direction orthogonal to the calculated estimated course of the own vehicle;

determining whether the other vehicle is a leading vehicle in the path of the own vehicle based at least in part on a comparison between the parameter and a threshold;

changing the threshold and/or the parameter and changing the likelihood of the other vehicle being determined as the leading vehicle in response to the calculated estimated course comprising a curve and in response to the other vehicle being located inwardly with respect to the curve, based on the calculated estimated course and the position of the other vehicle; and outputting a control signal to control a vehicle speed to keep a distance between the own vehicle and the leading vehicle.

15. A vehicle control device mounted on an own vehicle and configured to control the own vehicle according to the position of another vehicle ahead of the own vehicle, comprising:

a memory;

a processor communicable to the memory; and a set of computer-executable instructions stored on the memory that cause the processor to implement:

calculating an estimated course of the own vehicle;

setting a parameter indicating whether the other vehicle is in the path of the own vehicle based on the relative position of the other vehicle with respect to the own vehicle in a lateral direction orthogonal to the estimated course of the own vehicle;

determining whether the other vehicle is a leading vehicle in the path of the own vehicle based at least in part on a comparison between the parameter and a threshold;

determining whether the other vehicle is located in an inward direction with respect to the calculated estimated course in response to the calculated estimated course comprising curve;

changing the threshold and/or the parameter and changing the likelihood of the other vehicle being determined as the leading vehicle in response to the calculated estimated course comprising a curve and in response to the other vehicle being located inside the calculated estimated course, based on the calculated estimated course and the position of the other vehicle; and outputting a control signal to control a vehicle speed to keep a distance between the own vehicle and the leading vehicle.

16. The vehicle control device according to claim 15, wherein determining whether the other vehicle is located in an inward direction, further comprises:

determining that the other vehicle is located radially inward perpendicular to the curved course of the own vehicle.

* * * * *

UNITED STATES PATENT AND TRADEMARK OFFICE
CERTIFICATE OF CORRECTION

PATENT NO. : 10,392,015 B2
APPLICATION NO. : 15/545268
DATED : August 27, 2019
INVENTOR(S) : Jin Kurumisawa It is certified that error appears in the above-identified patent and that said Letters Patent is hereby corrected as shown below:

On the Title Page

In Column 1, Item (72), Line 5, under Inventors, delete "Toyota (JP);" and insert --Toyota-shi, Aichi-ken (JP);--.

In Column 1, Item (72), Line 6, under Inventors, delete "Toyota (JP)" and insert --Toyota-shi, Aichi-ken (JP)--.

In the Specification

In Column 8, Line 19, after "the own" insert --lane), and the first other vehicle 41 is ahead of the own vehicle 40. The estimation--.

In the Claims

In Column 21, Line 9, Claim 2, delete "is" and insert --being--.

In Column 22, Line 53, Claim 15, delete "curve;" and insert --a curve;--.

Signed and Sealed this
Twenty-first Day of January, 2020

Andrei Iancu
*Director of the United States Patent and Trademark Office*